United States Patent [19]

Nishida et al.

[11] Patent Number: 4,679,930
[45] Date of Patent: Jul. 14, 1987

[54] ONE-WAY REDUCING AND ENLARGING PRINTER

[75] Inventors: Fumihiko Nishida; Yasumasa Shimizu, both of Kyoto; Tomohiro Yoshida, Neyagawa; Makoto Urata, Kyoto; Tomiji Hotta, Kyoto; Masaji Mizuta, Uji; Hiroshi Yamashita, Toyonaka, all of Japan

[73] Assignee: Dainippon Screen Mfg. Co., Ltd., Kyoto, Japan

[21] Appl. No.: 726,072

[22] Filed: Apr. 22, 1985

[30] Foreign Application Priority Data

May 25, 1984 [JP] Japan .................. 59-107137
Feb. 25, 1985 [JP] Japan .................. 60-037212

[51] Int. Cl.⁴ .............................................. G03B 27/68
[52] U.S. Cl. ...................................... 355/52; 355/84
[58] Field of Search ................................ 355/52, 84

[56] References Cited

U.S. PATENT DOCUMENTS

| | | | |
|---|---|---|---|
| 3,007,390 | 11/1961 | Forester et al. | 355/84 |
| 3,374,724 | 3/1968 | Torres | 355/84 |
| 3,401,616 | 9/1968 | Cross | 355/52 |
| 3,445,165 | 5/1969 | Dubbs . | |
| 3,992,094 | 11/1976 | Adcock | 355/84 |
| 4,008,959 | 2/1977 | Parsons | 355/84 |
| 4,238,156 | 12/1980 | Parsons | 355/84 |
| 4,302,103 | 11/1981 | Zeunen | 355/84 |
| 4,390,272 | 6/1983 | Anderson | 355/84 |
| 4,420,249 | 12/1983 | Trump | 355/84 |
| 4,545,673 | 10/1985 | Bergsma | 355/52 |

FOREIGN PATENT DOCUMENTS

| | | |
|---|---|---|
| 57-1825 | 1/1982 | Japan . |
| 382729 | 11/1932 | United Kingdom . |
| 410889 | 5/1934 | United Kingdom . |
| 863178 | 3/1961 | United Kingdom . |
| 921070 | 3/1963 | United Kingdom . |
| 1455914 | 11/1976 | United Kingdom . |

Primary Examiner—Monroe H. Hayes
Attorney, Agent, or Firm—Brumbaugh, Graves, Donohue & Raymond

[57] ABSTRACT

A one-way reducing and enlarging printer to print a reduced or enlarged image in one direction onto a photosensitive material comprising a photosensitive material holder to mount the photosensitive material, a negative holder having a light transmissive property to mount a negative at a position opposite to the photosensitive material, a light source, a douser having a slit opening and placed between the light source and the negative, and control device to control relative motion among the photosensitive material holder, the negative holder, and the douser by the signals from a signal generating device.

7 Claims, 12 Drawing Figures

ONE-WAY REDUCING AND ENLARGING PRINTER

BACKGROUND OF THE INVENTION

1. Field of the invention:

This invention relates to a one-way reducing and enlarging printer (or one-way variable magnification printer) which enlarges or reduces an image of film only in one direction for printing on photosensitive materials.

Prior arts:

One-way (or unidirectional) variable magnification printers are ordinarily necessary to correct extension in peripheral direction at rotary press printing or to adjust the shrinkage allowance for plate making process or printing process.

The Official Gazzette of U.S. Pat. No. 3,445,165 discloses a photograph deforming device for slit exposure by a link driving system which moves a negative and photosensitive material placed under the exposure slit at different speed and in the same direction (perpendicular to the slit).

The Official Gazzette of Japanese Patent Publication (examined) No. Sho. 57-1825 also discloses a one-way reducing and enlarging plate making (graphic arts) device equipped with a first roller to feed negative films and a second roller to feed photosensitive films, in which the negative films and the photosensitive films are subjected to linear contact at a part of the circumference of the second roller, and the first and the second rollers are turned at different speeds for slit exposure.

By the photograph deforming device disclosed in the Official Gazzette of U.S. Pat. No. 3,445,165, the negative and photosensitive material are connected by a link driving system. Accordingly, the accuracy is limited to a certain degree because of flexibility of the link and mechanical errors in manufacturing.

By the one-way reducing and enlarging plate making device stated in the Official Gazzette of Japanese Patent Publication (examined) No. Sho. 57-1825, on the other hand, the rate of revolution (or rotational frequency) of both rollers can not be changed freely. It is accordingly necessary to adjust exposure of the photosensitive material by the light controller of the light source lamp and not by the rate of revolution of the rollers (i.e. the exposing time). However, accurate control of exposure is difficult since it is almost impossible to change intensity of the light source lamp without changing the color temperature.

SUMMARY OF THE INVENTION

An object of the present invention is to provide a one-way reducing and enlarging printer which achieves a high degree of accuracy through direct drive and control of the photosensitive material holder, negative holder, or the light source unit by the pulse from a pulse generator mounted on a motor.

A further object of the present invention is to provide a one-way reducing and enlarging printer of which exposure can be adjusted very easily and accurately by free setting of slit exposure speed.

Another object of the present invention is to provide a one-way reducing and enlarging printer of a compact design in which the light source unit can be moved by moving the negative holder to the reducing and enlarging dimension of the image only and without moving the photosensitive material holder of larger size than the negative or the negative holder of larger size than the negative by the dimensions of printing.

A yet further object of this invention is to provide a one-way reducing and enlarging printer in which, in spite of very simple structure, a negative and a photosensitive material are brought into uniform and perfect contact with each other irrespective of fine irregularities on the negative and photosensitive material holders, and an accurate and smooth difference in the relative speed is produced between the negative and the photosensitive material without causing damage to the emulsion face.

In order to accomplish the foregoing objects, the one-way reducing and enlarging printer according to the present invention comprises a photosensitive material holder to mount photosensitive material, a negative holder having a light transmissive property to mount a negative opposite to the photosentitive material, a light source, and a douser having a slit opening placed between the light source and the negative characterized by control means provided to control relative motion among the photosensitive material holder, the negative holder, and the douser based on the signals from signal generating means attached to the first driving means to be used to move any one of the photosensitive material holder, the negative holder of the douser.

One of the features of the one-way reducing and enlarging printer according to the present invention is that the first driving means is used for moving the douser and that the second driving means for moving either one of the photosensitive material holder or the negative holder is driven and controlled by the signals from the signal generating device attached to the first driving means.

Another feature of the one-way reducing and enlarging printer according to the present invention is that the first driving means is used for moving either one of the photosensitive material holder or the negative holder and that the second driving means for moving the other one of the photosensitive material holder or the negative holder is also driven and controlled by the signals from the signal generating device attached to the first driving means. In this case, it is also possible to mount the second driving means on the photosensitive material holder or the negative holder which is moved by the first driving means.

It is advantageous to employ a pulse motor or a servo-motor as the second driving means, because it is driven and controlled by the signals generated corresponding to the transfer speed of the photosensitive material holder, the negative holder, or the douser moved by the first driving means.

A further one-way reducing and enlarging printer to improve contact means between the negative and the photosensitive material is provided in accordance with the second embodiment in which a negative and a photosensitive material are superposed on each other and slit exposure is performed from the negative side while successively displacing relative position between the negative and the photosensitive material, in combination with means for blowing air to either said negative or said photosensitive material.

When embodying the present invention, the douser may be combined with the light source to be a light source unit which is moved, or the douser may be separate from the light source so that only the douser is moved. In the latter case, it is so contrived that the lights from the light source through an optical system such as a mirror are projected onto a photosensitive material for slit exposure through the slit of the douser.

Depending on the ratio of enlargement or reduction of the image, the relative speed differs between the photosensitive material holder and the negative holder. It is advantageous, therefore, to install a spacing control means so that the space between the two holders is kept at a specified distance depending on the thickness of the photosensitive material and the negative respectively held by the two holders.

BRIEF DESCRIPTION OF THE DRAWINGS

Other objects, features, and advantages of the present invention will be seen in connection with the accompanying drawings in which.

DESCRIPTION OF THE PREFERRED EMBODIMENTS

Figure 1:
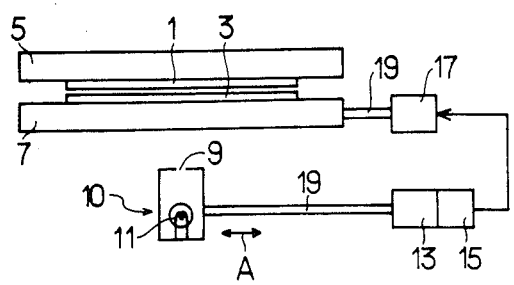
FIG. 1 to FIG. 3 are descriptive drawings of the principle showing the outline composition of the first to the third embodiments of the one-way reducing and enlarging printer according to the present invention.

FIG. 1 is a descriptive drawing of the principle showing outline structure of a one-way reducing and enlarging printer according to the present invention.

In the embodiment shown in FIG. 1, a photosensitive material holder (5) with a photosensitive material (1) attached onto the lower surface thereof is kept stationary while a light source unit (10) comprising a douser (or a light cutoff plate) (9) having a slit opening and a light source (11) is moved at a specified speed by means of a DC motor (13), then the photosensitive material (1) is subjected to slit exposure through a negative (3) mounted onto a negative holder (7) made of a glass plate, for example. At the time of exposure, a pulse generator (15) attached to the DC motor (13), which moves the light source unit (10) in the direction of arrow (A), transmits a pulse in proportion to the revolution of the motor (13). A pulse motor (17) is driven by the pulse so that the negative holder (7) is moved at a different speed from the speed of the lightsource unit (10), and so that the photosensitive material holder (5) and the negative holder (7) are moved relative to each other. As a matter of course, an arrangement is also possible wherein the photosensitive material holder (5) is moved in place of the negative holder (7).

Figure 4:
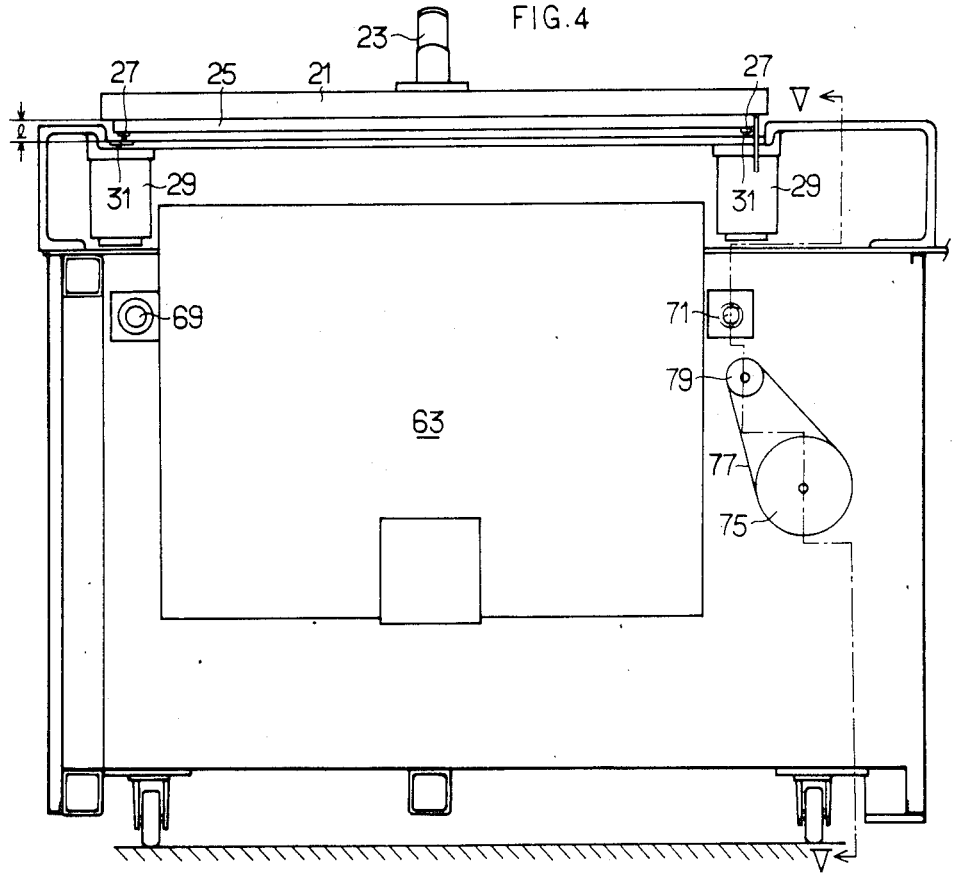
FIG. 4 is a front view of an apparatus for embodiment of the present invention.
Figure 5:
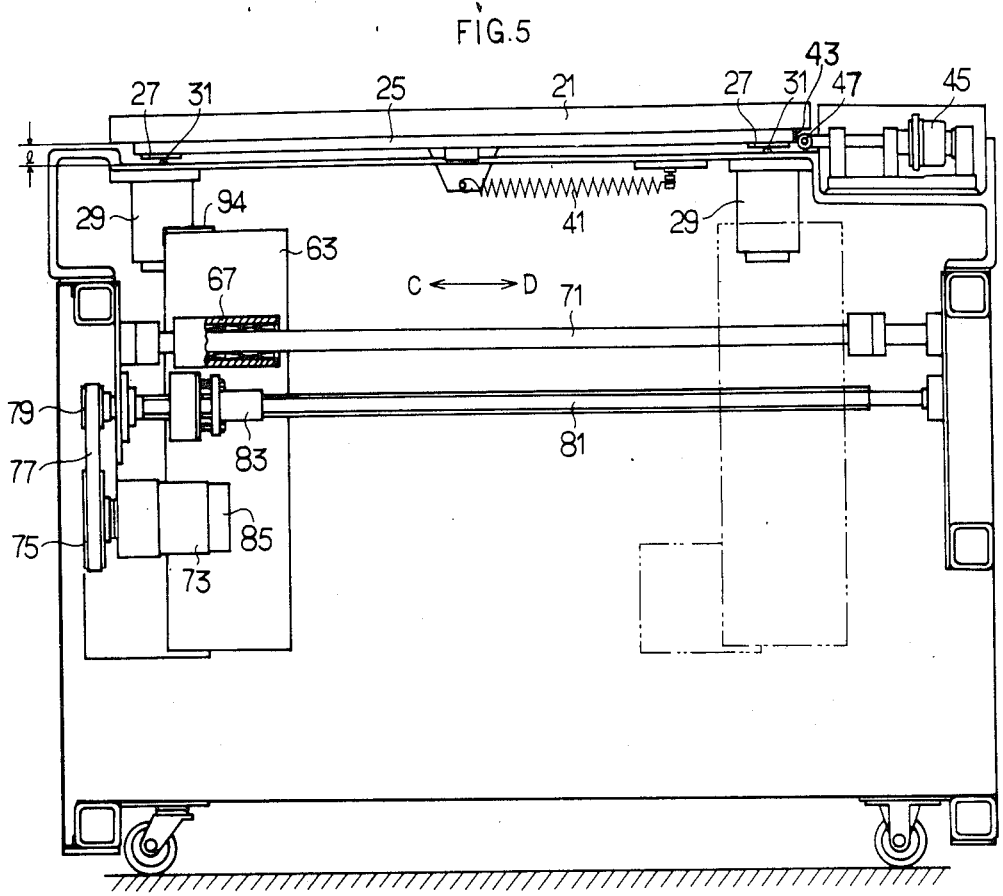
FIG. 5 is a sectional view taken along line V—V of FIG. 4.

FIGS. 4 to FIG. 10 show another embodiment based on the principle shown in FIG. 1, wherein FIG. 4 is a front view of an apparatus for embodying the invention and FIG. 5 is a sectional view taken along line V—V of Fig. 4.

In these drawings, a photosensitive material holder (21) is so composed that the photosensitive material (1) (omitted in FIG. 4 and FIG. 5) is drawn onto the lower surface of the holder (22) by connecting an exhaust pipe (23) to a blower or the like not illustrated in the drawings. The photosensitive material holder (21) is attached to the printer body at certain interval (l) by a hinge or other mechanism (not illustrated) so as to be opened and closed freely.

A negative holder (25) made of a glass plate or other light transmitting material is composed so as to hold the negative (3) (omitted in FIG. 4 and FIG. 5) such as a film or a dry plate on the top surface by vacuum drawing. The negative holder (25) is supported on the bearing (31) of the negative holder up-down mechanism (29), described hereunder, at the four corners with protective members (27) such as rubber sheet. By said up-down mechanism (29), the negative holder (25) is moved up and down so that the interval may be set freely in relation to the photosensitive material holder (21).

Figure 6:
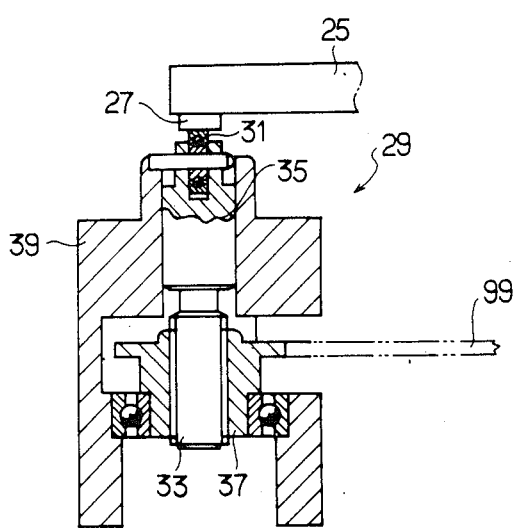
FIG. 6 is a sectional view showing the composition of the negative holder up-down mechanism of the same embodiment.

As shown in FIG. 6, the negative holder up-down mechanism (29) has a bearing (31) at the upper part, and the lower part of the up-down mechanism (29) compises a shaft (35) with threads (33), a sprocket (37) interlocked with the threads (33) of the shaft (35), and a bearing (39). The sprocket (37) is engaged with a chain (99) and is turned by moving the chain (99) in a horizontal direction causing the bearing (31) to move up and down. Since the sprockets (37) of the four negative holder up-down mechanisms (29) supporting the negative holder (25) on its four corners are connected with each other through the chain (99), the up-down motion of each bearing (31) is controlled to be the same amount at all times. The chain (99) can be driven easily by a handle, not illustrated, or similar device.

The negative holder (25) is urged in the direction of arrow (D) shown in FIG. 5 by a spring (41) stretched in the direction of motion and is always kept in contact with a bearing (47) (see FIG. 7 and FIG. 8) of a negative holder feeding mechanism (45), described hereunder, through a protective member (43).

Figure 7:
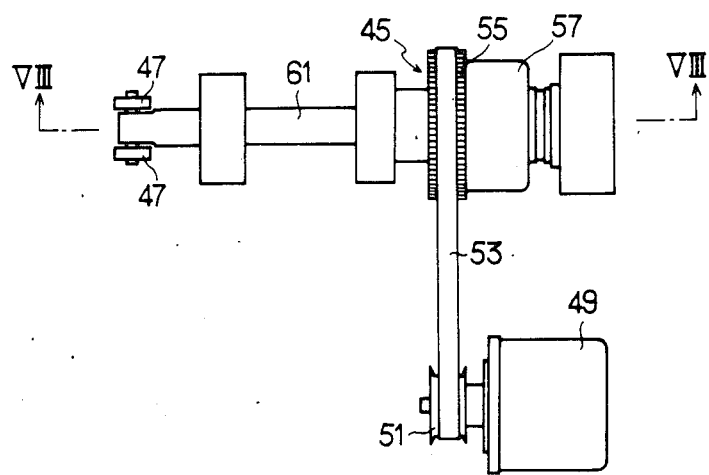
FIG. 7 is a plan view showing the composition of the negative holder feeding mechanism of the same embodiment.
Figure 8:
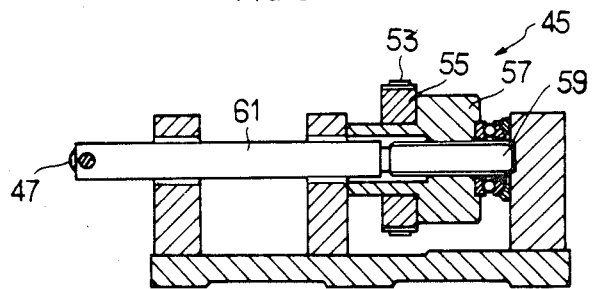
FIG. 8 is a sectional veiw taken along line VIII—VIII of FIG. 7.

As shown in FIG. 7 and FIG. 8, the negative holder feeding mechanism (45) drives a shaft (61), having a thread (59) interlocked with a nut (57) in the direction (C-D) in FIG. 5, by revolution of the pulse motor (49) and through a timing pulley (51), a timing belt (53), a timing pulley (55) and the nut (57), and the negative holder (25) is moved through the protective member (43) by the bearing (47) provided at the top end of the mechanism. The bearing (47) at the top end of the shaft (61) follows the up-down motion of the negative holder (25).

In the drawings, numeral (63) is a light source unit incorporating a light source (65) (see FIG. 9), which is supported by guard rails (69) (71) through a linear ball bearing (67) so as to move in the direction (C-D) between the positions indicated by the solid line and the two-dot chain line in FIG. 5. In FIG. 5, numeral (73) is a DC motor, which turns a feed screw (81) through a timing pulley (75), a timing belt (77), and a timing pulley (79) and moves the light source unit (63) in the direction (C-D) by driving a feed nut (83) interlocked with the feed screw (81). A pulse generator (85) attached to the DC motor (73) performs the function of proportioning the revolution of the DC motor (73) (i.e. transfer of the light source unit (63)) to the revolution of said pulse motor (49).

Figure 9:
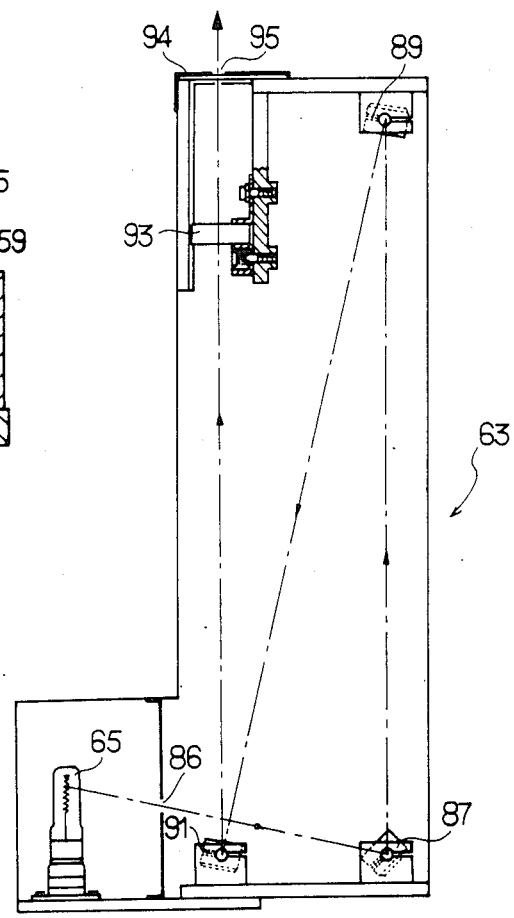
FIG. 9 is a schematic diagram of the optical system of the light source unit.

FIG. 9 is a schematic drawing illustrating the optical system of the light source unit (63). The light from the light source (65), such as an iodine lamp, goes through an opening (86), then is reflected by mirrors (87) (89), (91) and turned into a parallel beam by a lens (93) to be radiated through a slit (95) on the douser (94). The mirrors (87), (89), (91) are used to extend the optical path and to make the beam as completely parallel as possible. The lens (93) is not necessarily required if the optical path is long enough.

Figure 10:
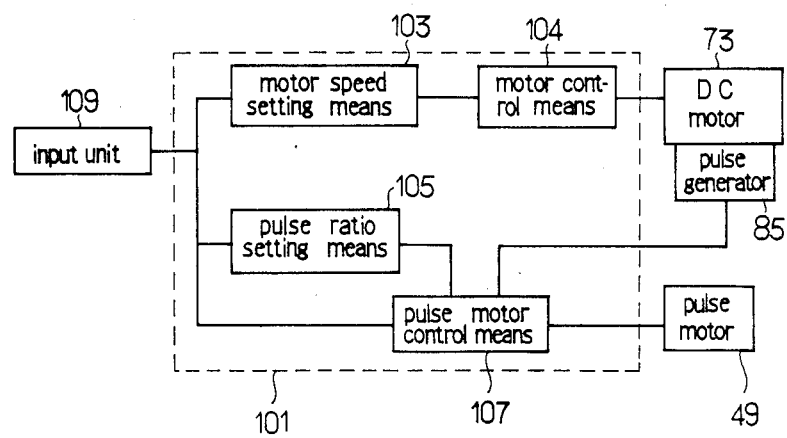
FIG. 10 is a block diagram showing the control mechanism of the above embodiment.

FIG. 10 is a block diagram showing the control mechanism of the apparatus for this embodiment, wherein (101) is a micro computer comprising motor speed setting means (103) for setting speed of DC motor (73), pulse ratio setting means (105) for setting pulse ratio based on the reducing or enlarging ratio of the image to be formed on a photosensitive material, and pulse motor control means (107) to generate the pulse to drive the pulse motor (49) based on the signals from the pulse ratio setting means (105) and on the pulse from the pulse generator (88). In the diagram, numeral (109) is an input unit for inputting printing conditions.

Now the printing operation using the apparatus for this embodiment is described in detail hereunder.

In the first place the negative holder up-down mechanism (29) is adjusted, and the negative (3) and photosensitive material (1) are mounted while adjusting the interval between the photosensitive material holder (21) and the negative holder (25) so as to provide a gap of about 0.1 mm between the negative (3) and the photosensitive material (1). This gap is not necessarily required depending on the type of photosensitive material (1) and the negative (3) or on the printing condition. Then the photosensitive material (1) and the negative (3) are mounted respectively onto the lower face of the photosensitive material holder (21) and onto the upper surface of the negative holder (25).

Then the printing condition is input. An exposure is set according to the photosensitive material (1) in such manner that the turning speed of the DC motor (73) is set by the motor speed setting means (103) through the motor control means (104) depending on the input condition given by the input unit (109). Accordingly the exposure can be doubled by reducing rotary speed of the DC motor (73) to ½ and can be reduced to ½ by doubling the speed of the DC motor (73).

Then the enlarging or reducing ratio in one direction of the image is set. This setting is performed by inputting the printing method of the negative (3) and the desired enlarging or reducing dimensions to the printing dimensions with the input unit (109) and by setting the necessary number of pulses to be sent from the pulse motor control means (107) to the pulse motor (49) when one pulse is sent from the pulse generator (85) to the pulse motor control means (107) with the pulse ratio setting means (105).

Setting of either enlargement or reduction is made by inputting the rotating direction of the pulse motor into the pulse motor control means (104) with the input unit (109).

Printing is started when the above settings are completed. First the lamp of the light source (65) is lit and the DC motor (73) turns to move the light source unit (63) in the direction (D) of FIG. 5. The pulse motor (49) turns at the same time according to the pulse from the pulse generator (85) to move the negative holder (25) in the direction (D) for enlargement, direction (C) for reduction. The light source unit (63) moves by the dimensions of the image after being printed, while the negative holder (25) moves by the intended reducing or enlarging dimensions of the image. When completing the printing, the DC motor (73) and the pulse motor (49) turn in reverse to return the light source unit (63) and the negative holder (25) to their original positions respectively thereby completing the printing operation. To prevent printing before the light source unit (63) reaches a certain speed at the time of starting the pringing operation, it may possible to provide a period for acceleration.

Figure 2:
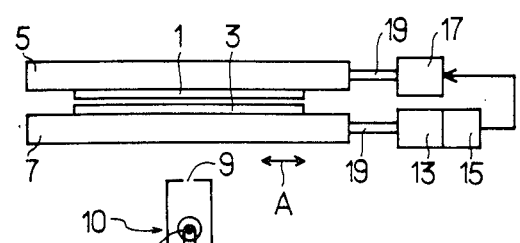
Figure 3:
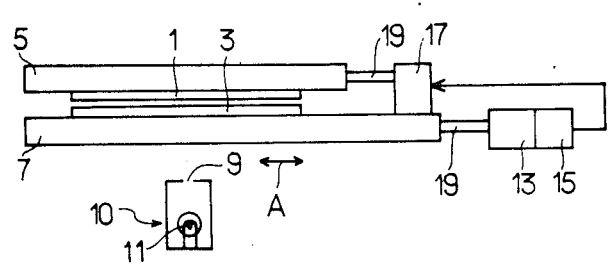

The above embodiment is based on the principle shown in FIG. 1 and other embodiments are also possible based on the principles shown in FIG. 2 and FIG. 3 respectively.

In the embodiment shown in FIG. 2, the douser (9) having a slit opening is fixed, while the photosensitive material holder (5) and the negative holder (7) are moved on the douser (9) having a slit opening for exposing the photosensitive material (1) through the negative (3). At this time, the negative holder (7) is moved by the DC motor (13) and the photosensitive material holder (5) is moved by driving the pulse motor according to the pulse from the pulse generator (15), which generates the pulse in proportion to the revolution of the DC motor (13) so as to create speed difference between the photosensitive material holder (5) and the negative holder (7).

In the embodiment shown in FIG. 3, the douser (9) having a slit opening is also fixed but the photosensitive material holder (5) and the pulse motor (17) can be moved together with the negative holder (7). In other words, the negative holder (7) is moved by driving the DC motor (13) while the pulse motor (17) is driven by the pulse from the pulse generator (15) which generates the pulse in proportion to the revolution of the DC motor (13) to move the photosensitive material holder (5) on the negative holder (7) thereby creating the relative speed difference.

On the embodiments according to the principles shown in FIG. 2 and 3, detailed descriptions are omitted here as they will be fully understood from the descriptions referring to FIG. 4 to FIG. 10. In the light of the substance of the present invention, it is obvious that these embodiments are included in the present invention.

In the embodiments of FIG. 2 and FIG. 3, it is also possible to drive the photosensitive material holder (5) by the DC motor (13) and the negative holder (7) by the pulse motor (17).

In the above examples of FIG. 1 to FIG. 3, it is further possible that the pulse generator (15) be provided at a place other than the DC motor (13) and a servomotor be used in place of the pulse motor (17). Having described specific embodiments of our bearing, it is believed obvious that modification and variation of this invention are possible in the light of the above teachings.

Figure 11:
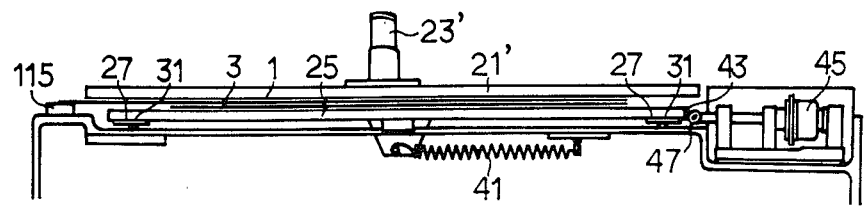
FIG.11 is a side view of the upper part of a one-way reducing and enlarging printer persuant to the present invention.
Figure 12:
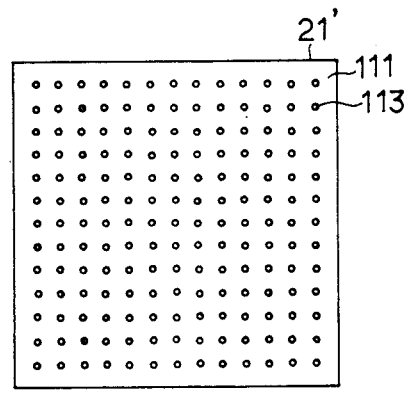
FIG. 12. is a bottom view of a blower board of the printer shown in FIG. 11.

Furthermore, although in the above-described embodiments the photosensitive material (1) and the negative (3) are held respectively by the photosensitive material holder (21) and the negative holder (23) in such manner as to be drawn onto the suface of each holder by vacuum suction, a further method of close contact between the photosensitive material (1) and the negative (3) is possible as an improvement. That is, either the photosensitive material (1) or the negative (3), i.g., the negative (3) is held on the upper side of the negative holder (25) by vacuum suction, while an end of the photosensitive material (1) is positioned and fix to photosensitive material supporting member directly or through a lead film by means of an adhesive tape or the like as shown in FIG. 11. And a blower board (21') having air blowing apertures (113) is disposed on the lower side (111) as shown in FIG. 12 in place of the photosensitive material holder (21) of the above embodiment, and by using the exhaust pipe (23) of the foregoing embodiment as an air inlet pipe (23') with which the blower (not illustrated) is connected, air is blown out of said apertures (113) of the blower board (21') to the entire surface of the photosensitive material (1). By this air blowing process, the photosensitive material (1) is brought into uniform and perfect contact with the negative (3) under a certain air pressure.

It is also possible to blow air out of the apertures (113) sequentially to the photosensitive material (1) near the slit exposure area with the movement of the light source unit (63) in place of blowing air to the entire surface of the photosensitive material (1).

Furthermore, other than the foregoing methods of blowing air to the photosensitive material (1) with the negative (3) held on the negative holder (25), it is further possible to blow air to the negative (3), while the photosensitive material (1) is being held on the photosensitive material holder (21) by vacuum suction or the like omitting the negative holder (25). In this case, air can be blown either to the entire surface of the negative (3) while an end of the negative (3) being fixed onto a movable member, or from the area near the slit (95) or from the slit (95) with the movement of the light source unit (63).

Having described specific embodiments of this invention, it is believed obvious that modification and variation of this invention are possible in the light of the above teachings.

We claim:

1. A one-way reducing and enlarging printer comprising:
   a holder for holding a photosensitive material;
   a light transmissive negative holder provided under said photosensitie material holder so as to hold a negative opposite to the photosensitive material;
   a light source provided so as to be movable under said negative holder;
   a douser having a slit opening and being provided between said light source and the negative, said douser being movable together with said light source;
   a first driving motor for moving said douser;
   a second driving motor for moving either one of said photosensitive material holder and said negative holder, said photosensitive material holder and said negative holder being movable relative to one another;
   signal generating means attached to said first driving motor for generating a signal;
   means for controlling the relative motion between said photosensitive material holder and said negative holder based upon said signals from said signal generating means; and
   means for blowing air directly onto a back surface of the photosensitive material so as to bring the photosensitive material into contact with the negative.

2. A one-way reducing and enlarging printer as defined in claim 1, wherein said second driving motor is a pulse motor.

3. A one-way reducing and enlarging printer as defined in claim 1, wherein said second driving motor is a servo-motor.

4. A one-way reducing and enlarging printer as defined in claim 1, wherein said photosensitive material holder and said negative holder are provided so as to have a variable interval therebetween.

5. A one-way reducing and enlarging printer as defined in claim 1, wherein said blowing means is provided so as to blow air over the entire back surface of said photosensitive material.

6. A one-way reducing and enlarging printer as defined in claim 1, wherein said blowing means is provided so as to blow air sequentially to said photosensitive material near a slit exposure area.

7. A one-way reducing and enlarging printer as defined in claim 1, wherein said blowing means is disposed on the photosensitive material side so as to blow air on the photosensitive material.

* * * * *